Figure 5:
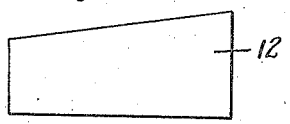

Dec. 6, 1938.  G. CLAUSING  2,139,442
METHOD OF REMODELING LASTS
Filed Oct. 24, 1936  2 Sheets-Sheet 1
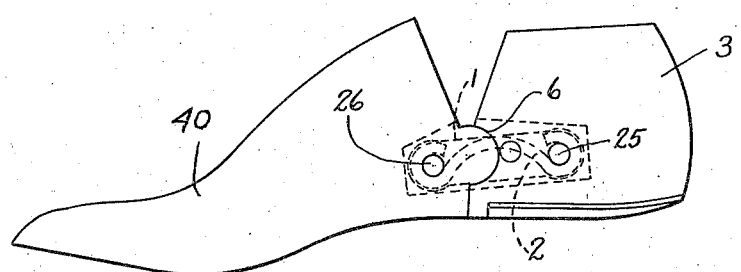
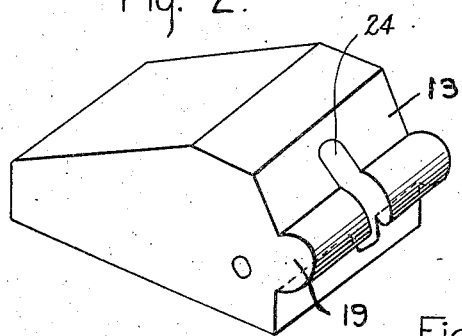
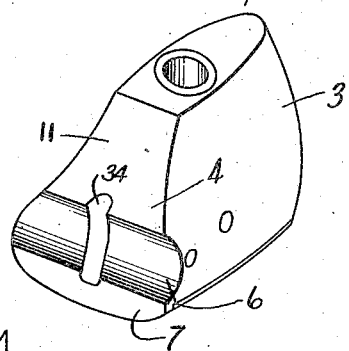
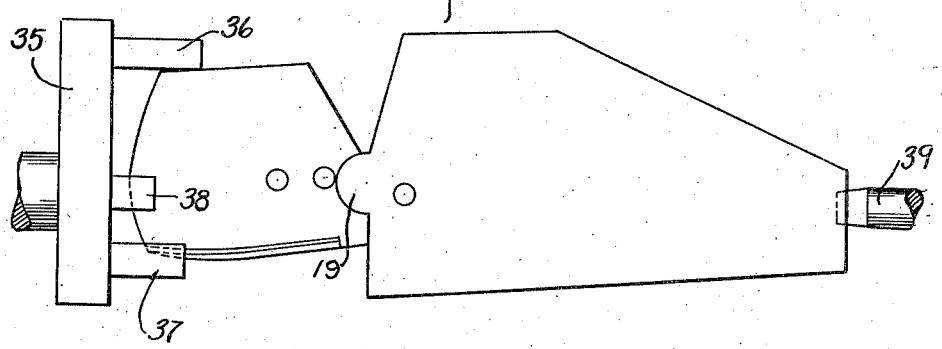
INVENTOR.
George Clausing
BY
ATTORNEYS.

Dec. 6, 1938.  G. CLAUSING  2,139,442

METHOD OF REMODELING LASTS

Filed Oct. 24, 1936  2 Sheets—Sheet 2

INVENTOR.
George Clausing
BY *Pennie Davis Marvin Edmonds*
ATTORNEYS.

Patented Dec. 6, 1938

2,139,442

UNITED STATES PATENT OFFICE 2,139,442

METHOD OF REMODELING LASTS

George Clausing, Portsmouth, Ohio, assignor to Vulcan Corporation, Portsmouth, Ohio Application October 24, 1936, Serial No. 107,312

6 Claims. (Cl. 12—146)

This invention relates to a method of remodeling shoe lasts and, particularly, to a method of replacing a whole fore part to produce a rebuilt hinged last.

To justify the practice of rebuilding lasts, a highly efficient method must be employed. As the cost of the rebuilding operation approaches the cost of manufacturing new lasts, the justification for remodeling becomes less and less. Furthermore, if the lasts produced by remodeling are not perfectly formed and are not a highly serviceable last, nothing is gained by the remodeling operation.

It is the chief object of the present invention to provide a method of rebuilding a last, the product of which will have the same serviceability and accuracy of a new last and at a minimum cost, substantially less than the cost of manufacturing a new last.

A further object of the invention is to provide a remodeled last, in which the style form may be completely altered from that of the original last.

A further object of the invention is to provide a remodeled last, in which the new portion is accurately aligned with the old portion, and in which the newly formed hinge element has smooth, accurate pivoting movement with no lost motion or looseness.

Other objects and features of the invention will more fully appear from the following specification in connection with the accompanying drawings and will be particularly pointed out in the claims.

A particular embodiment of the invention is shown in the drawings and will be described. Such disclosure, it will be understood, does not limit the scope of the invention to the use of the specific elements illustrated or to the specific sequence of the steps involved in the process.

It is unavoidable in the manufacture of shoes that a supply of lasts will accumulate which have been out-moded or have become useless for other reasons. The practice of the present invention gives to these unserviceable lasts a new usefulness and, in so doing, becomes a practical and vital factor in the shoe art. Briefly stated, the present method contemplates the disassembling of the last parts and discharging the fore part thereof. A transverse groove of cylindrical form is cut upon the hinge face of the salvaged heel part. A cooperating hinge face is then formed upon the back face of a rough fore block. This latter hinge face has a projection of cylindrical form complementary to and received within the groove in the heel part. The heel part and the fore block thus processed are then secured together by means of suitable hinge elements, such as connecting links and a spring or in any other suitable manner. The assembled heel part and fore block are then placed in a last turning lathe upon an axis, which has been predetermined to be coincident with the turning axis of the model to be copied. The fore block is then turned in the lathe to conform to the model.

Figure 8:
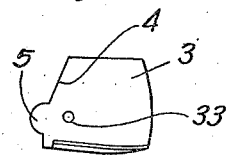
Figure 6:
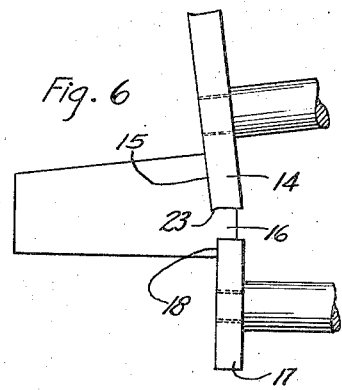
Figure 9:
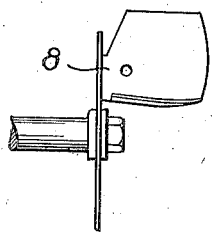
Figure 7:
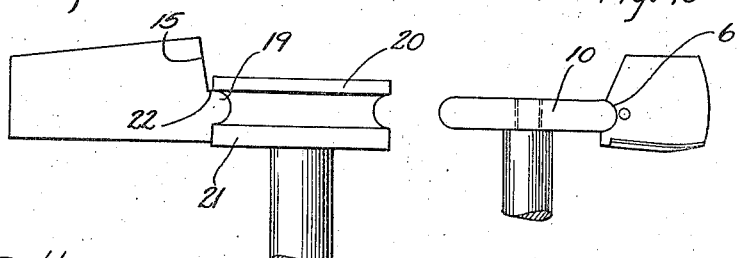
Figure 10:
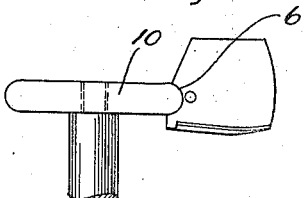
Figure 11:
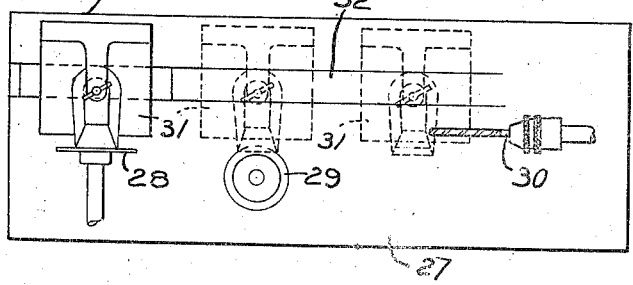

To present a more complete and accurate conception of the invention, the particular embodiment illustrated in the drawings will now be described in detail. In the drawings, Fig. 1 is a side elevation of a last processed in accordance with the invention. Fig. 2 is a perspective view of a fore block in its rough state, but prepared to be assembled to the heel part, prior to the turning operation. Fig. 3 is a perspective view of the heel part processed to be assembled upon the fore block. Fig. 4 is a side elevation of an assembled heel part and a rough fore block as they appear in the last lathe prior to the turning operation. Figs. 5, 6 and 7 illustrate diagrammatically the steps in the preparation of a rough fore block. Figs. 8, 9 and 10 illustrate the steps in the preparation of the heel part of the last, prior to the assembling and turning operation. Fig. 11 is a diagrammatic showing of the essential elements of an apparatus for carrying out the invention.

The invention is especially adapted to the production of hinged lasts composed of two parts, a heel part and a fore part pivoted together, and in which the opposed hinging faces of the parts have inter-engaging concave and convex portions of cylindrical form. Throughout the specification and claims, the term "heel part" relates to the whole portion of the last to the rear of and including the rear portion of the necessary hinge element, while the "fore part" relates to all other portions of the last.

The first step in the remodeling process is to remove and discard the fore part of the last to be processed. If they are metallic hinge parts, such as the link 1 and the spring 2 shown in Fig. 1 of the drawings, these are removed, together with the usual anchor pins serving to secure them in the last. The heel part 3 is now ready to be processed. Its hinge face 4 at this time may have any form common to hinge lasts, for instance, it may have a projection 5 shown in Fig. 8. If such a projection exists, it is removed during the process as will appear hereinafter. If the last to be processed is of the well-known block or one-piece type, the first step in the process is to sever the fore part from the heel part by cutting or sawing.

One of the major steps of the process is the formation of the hinge face 4 on the heel part. It matters not in practicing the invention whether this operation is done before or after treatment of the fore block. The hinge face 4 is shaped to present a transverse groove 6, the cross section of which is in the form of an arc of a circle, and a flat face 7 situated in a plane parallel to the axis of the groove 6. The face 7 is cut by means of a saw 8 or any other suitable cutter, by passing the heel across the saw or by passing the saw across the heel, the diagrammatic illustration of which is shown in Fig. 9. In the case of a block or one-piece last, this operation may be accomplished by the severing operation. The groove 6 extending transversely across the heel block is then cut in any suitable manner, such as by means of a formed cutter having cutting edges of circular contour, such as the cutter 10 shown in the drawings. The groove 6 may be formed by feeding the heel past the cutter or by feeding the cutter past the heel. The depth of the groove 6 is substantially equal to, but not greater than the radius of curvature of the groove. Upon completion of these steps in the preparation of the heel part, it may be found necessary to re-work the portion 11 of the hinge face 4. If it is found that the portion 11 will interfere with the hinge movement between the two parts of the last, then this surface is recut to permit the necessary degree of hinging movement between the fore and heel part. The position of this surface and the accuracy of its formation is not critical, since it has no direct function in the alignment of the two last parts.

The next major step in the process is the preparation of a rough fore block 12, shown in Fig. 5. This step consists in shaping the hinge face 13 of the rough fore block to co-operate with the hinge face 4 of the heel part. A suitable procedure for shaping this face is illustrated in Figs. 6 and 7. In Fig. 6, a rotary cutter 14 makes a cut across the block, shaping the face 15 and the upper wall of a substantially rectangular projection 16. Desirably the cutter 14 is properly angled to cut the face 15 at the desired angle to permit the last to be contracted the necessary amount. Desirably, simultaneously with the operation of the cutter 14, another cutter 17 makes a cut to produce the face 18 and the bottom wall of the projection 16. The face 18 may at this time receive its final finish or receive a final finishing cut during a subsequent operation, as will be pointed out hereinafter. The face 18 is properly positioned to abut the face 7, when the last parts are assembled and in expanded position.

The projection 16 is now given a cylindrical shape thereby to form the male member 19 of the last hinge joint, which nicely fits within the groove 6. This shaping operation may be done in any desired manner, such as by the use of a rotating formed cutter 20. If the face 18 has not been given its final finishing cut, the flat surface 21 upon the cutter 20 will function to re-surface the face 18, and by so doing, the convex male projection 19 is formed in perfect alignment with this face, such alignment being of great importance in producing a perfect last, for the reason that the surface 18 on the fore block and the surface 7 on the heel part must be parallel and abut throughout their whole area, when the last is assembled, thereby to withstand the pressures imposed at this point during the shoe making process.

When a concave cutter, such as the cutter 20 is employed to form the projection 19, it is possible to shape only that much of its surface as embraces a semi-cylinder. This is not sufficient to permit the heel and fore parts to pivot as they move from contracted to expanded position. The necessary additional area 22 of the projection 19 may be shaped by the cutter 14, as shown at 23, or it may be formed in any suitable manner.

The fore block 12 may be prepared by means other than that above described, for instance, the cut made by the cutters 14 and 17 may be made upon a band or circular saw.

If the last is to be assembled by means of links and spring elements, such as the link 1 and spring 2, a chamber 24 must be formed in the hinge face of the fore block to receive the forward ends of these elements. One convenient method is to form this chamber upon a routing machine in a manner well known in the art.

The heel 3 and the fore block 12 are now ready to be assembled, one upon the other, with the exception of drilling the holes for the anchor pins 25 and 26. In the type of last illustrated, the spring 2 must be tensioned a predetermined amount to set up the desired pressure between the hinge faces. In drilling the pin holes therefor, the total distance between the drilled holes must be held within the required tolerance. This may be done by means of a drilling fixture after the heel and fore blocks have been processed to the point already described. In place of the use of a drilling fixture, however, this drilling operation may be effected in a manner described hereinafter.

Fig. 11 illustrates a suggested apparatus for rapidly and accurately effecting the various steps in the process. A bed or table 27 has adjustably mounted thereon, three driven elements, such as the saw 28, a formed cutter 29 and a drill and spindle 30. A heel part 3 is shown clamped in a carriage 31. The carriage is arranged to slide in a slot 32 or upon straight ways of any construction to produce true linear motion of the parts being processed. When processing a heel or a fore block by means of this apparatus, the three stations represented by the saw 28, cutter 29 and the drill 30 are adjusted accurately with respect to the path of movement of the heel or fore block to execute their respective operations at the correct position on the last part. As the carriage 31 is moved along the table 27, the saw 28 engages the heel and performs the operation described in connection with Fig. 9. The carriage then moves along to cause the cutter to be engaged with the heel 29, which performs the operation described in connection with Fig. 10. The carriage 31 then moves into position to cause the drill station 30 to drill a correctly positioned hole for the pin 25. The fore block 12 may likewise be processed on an apparatus of this character by substituting the necessary cutters at their respective station and properly adjusting each element with respect to the path of the fore block. By drilling the heel and fore block to receive their respective anchor pins 25 and 26 in the manner above described, the total distance between the holes when the two parts are assembled is positively fixed. Obviously by employing an arrangement, such as that shown in Fig. 11, uniformly accurate fore blocks and heel parts may be processed at high production speeds. When a heel part having the characteristics of that shown in Fig. 3 is to be processed by the present invention, the original anchor pin hole 33 desirably is filled in any suitable manner, such as by inserting a dowel and finishing the ends of the dowel flush with the surface of the last.

The heel part and fore block are now assembled. In the particular embodiment of the invention shown and described, they are assembled by placing the links and spring in position within the chambers 24 in the fore block and the chamber 34 in the heel part and then driving home the anchor pins 25 and 26. The assembled last is now placed in a turning lathe upon its correct turning axis. This axis may be determined in any suitable manner, such as by means of a centering fixture commonly used in the last remodeling operations and well known to those skilled in the art. In determining this axis, the gauging of the last must be done from the heel part only of the combined heel and fore block. The axis thus determined must coincide with the axis upon which the model to be copied is rotated.

To insure a firm grip upon the heel 3 in the last lathe and one which will not injure the last, the lathe desirably is provided with a special heel dog, which may be of the construction illustrated in Fig. 4. This dog has a body portion 35 secured upon the spindle of the lathe and a pair of adjustable clamping jaws 36 and 37, and a V-block 38 for centering the last in a horizontal plane. The toe dog 39 is then forced into position at the center upon the toe end of the block 12, which has been determined by the centering process. The last is then turned in accordance with the model and finished in the usual manner, presenting a new fore part 40 having the desired new contour.

The resulting rebuilt last will be equally as efficient as the original last and is characterized by particularly accurate alignment between its heel and fore parts and, furthermore, the hinge joint has a perfect fitting inter-engaging pair of cylindrically formed faces which insures smooth flexing of the hinge and no possibility of looseness or relative twisting of the two parts about a longitudinal axis.

It will be particularly noted that in the present invention, the number and complexity of operations are reduced to a minimum, thereby rendering the practice of the invention a thoroughly practical commercial adjunct of the last making art.

What I claim is:

1. The method of renewing a whole fore part in a hinged shoe last, comprising removing the fore part at the hinge, forming a hinge face upon the heel part having a transverse groove with a cross section in the form of an arc of a circle, forming a co-operating hinge face upon a rough fore block having a projection of rounded form to be received in said groove in the heel part, assembling the heel part and fore block, placing the assembled parts in a last turning lathe and cutting the fore block to conform to a selected model in the lathe.

2. The method of renewing a whole fore part in a hinged shoe last, comprising removing the fore part at the hinge, preparing a hinge face upon the heel part thereof, including the step of cutting a transverse groove therein having a cross section in the form of an arc of a circle, preparing a co-operating hinge face upon a rough fore block including the operation of cutting a projection of curved form closely fitting the said groove in the heel part and permitting hinge action between the two parts, joining the heel part and fore block, placing them in a last lathe having the model to be copied mounted therein in such position that said heel part will rotate upon an axis coincident with the axis of rotation of said model and cutting the fore block in accordance with the model.

3. The method of renewing a whole fore part in a hinged shoe last, comprising removing the fore part thereof at the hinge, cutting a transverse groove with a cross section in the form of an arc of a circle in the hinge face of the heel part thereof, preparing a co-operating hinge face upon a rough fore block including the operation of cutting or shaping a projection of curved form to fit said transverse groove in the heel part, joining the heel and fore block in their normal standard expanded relation, determining the turning axis of the model to be copied, locating in the last to be turned a turning axis coincident with the axis of the model, placing the model and last in a last turning lathe to rotate upon their respective axes and turning the said fore block to conform to the model.

4. A method of remodeling hinged shoe lasts which comprises separating the heel and fore parts of the last and forming the front end of the heel part with a substantially flat face, cutting the heel part transversely to form a groove in said flat face having a cross section in the form of an arc of a circle, cutting a rough fore part to form a substantially rectangular projection at the rear end thereof coinciding with said groove, cutting the projection to give it a rounded form adapted to fit closely in the groove of the heel part, assembling the heel and fore parts, placing the assembled parts in a last turning lathe, and cutting the fore block to conform to a selected model in the lathe.

5. A method of remodeling hinged shoe lasts which comprises separating the fore and heel parts of the last, forming the front end of the heel part with a substantially flat face, cutting said flat face of the heel part transversely above the bottom thereof to form a groove having a cross section in the form of an arc of a circle, cutting the fore part to form a substantially rectangular projection at its rear end above the bottom thereof coinciding with the groove in the heel part, cutting said projection to give it a rounded form to fit closely in said groove and simultaneously finishing the portion of the rear end of the fore part below said projection to fit against the portion of said flat face of the heel below the groove when the parts are assembled, assembling the heel part and fore part, placing the assembled parts in a last turning lathe, and cutting the fore block to conform to a selected model in the lathe.

6. The method of remodeling a last including a heel part having the male portion of a hinge joint and a fore part having the female portion of a hinge joint, which comprises separating the heel and fore parts at the hinge, cutting the heel part transversely to remove the male portion thereof and form a substantially flat face, cutting said flat face of the heel part transversely to form a groove having a cross section in the form of an arc of a circle, cutting a fore part to form a substantially rectangular portion at the rear end thereof coinciding with said groove, cutting the projection to give it a rounded form adapted to fit closely in the groove of the heel part, assembling the heel and fore parts, placing the assembled parts in a last turning lathe, and cutting the fore block to conform to a selected model in the lathe.

GEORGE CLAUSING.